United States Patent [19]

Weaver

[11] Patent Number: 4,458,710

[45] Date of Patent: Jul. 10, 1984

[54] METHOD OF MAKING A VALVE CONSTRUCTION HAVING MULTIPLE PISTONS

[75] Inventor: Marvin P. Weaver, Knoxville, Tenn.

[73] Assignee: Robertshaw Controls Company, Richmond, Va.

[21] Appl. No.: 374,044

[22] Filed: May 3, 1982

[51] Int. Cl.³ ............................................. F16K 17/38
[52] U.S. Cl. ....................................... 137/15; 137/79; 137/315; 29/157.1 R; 251/357; 251/86
[58] Field of Search ............... 137/15, 79, 595, 315; 251/357, 86; 29/157.1 R; 403/326, 155

[56] References Cited

U.S. PATENT DOCUMENTS

| | | | |
|---|---|---|---|
| 1,784,381 | 12/1930 | O'Stroskie | 137/315 |
| 1,842,902 | 1/1932 | Faber | 137/315 |
| 2,929,410 | 3/1960 | Morrison | 137/315 |
| 3,972,472 | 8/1976 | Kawabata | 137/595 |
| 4,000,849 | 1/1977 | Wagner et al. | 137/595 |
| 4,085,775 | 4/1978 | Steele, Jr. | 251/359 |
| 4,188,145 | 2/1980 | Poling | 29/453 |
| 4,228,817 | 10/1980 | Weaver | 137/79 |

Primary Examiner—A. Michael Chambers
Attorney, Agent, or Firm—Candor, Candor & Tassone

[57] ABSTRACT

A method of making a valve construction comprising the steps of forming the housing to have a plurality of valve seat sections disposed in spaced substantially parallel relation, forming a piston unit to comprise a plate and a plurality of pistons disposed in spaced substantially parallel relation and being carried by the plate as an assembly therewith to be axially movable in the housing under the influence of a condition responsive device, disposing the piston unit as an assembly thereof in the housing so that the pistons are respectively received in the valve seat sections, and forming the plate and the pistons so that the pistons can move relative to each other in the assembly thereof while maintaining the substantially parallel relation thereof during the step of disposing the piston unit in the housing so that the pistons will self-align with their respective valve seat sections as the pistons are being received therein.

10 Claims, 7 Drawing Figures

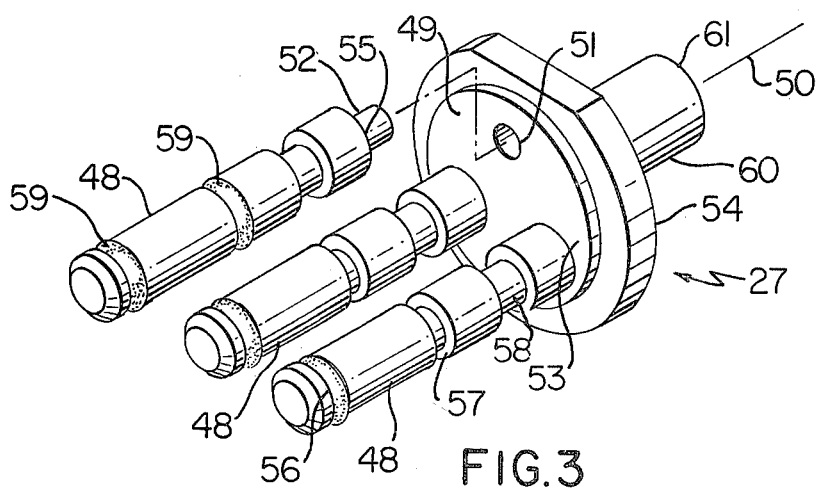
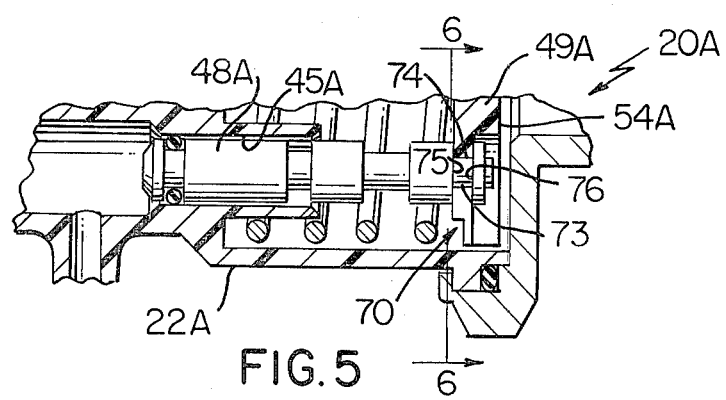
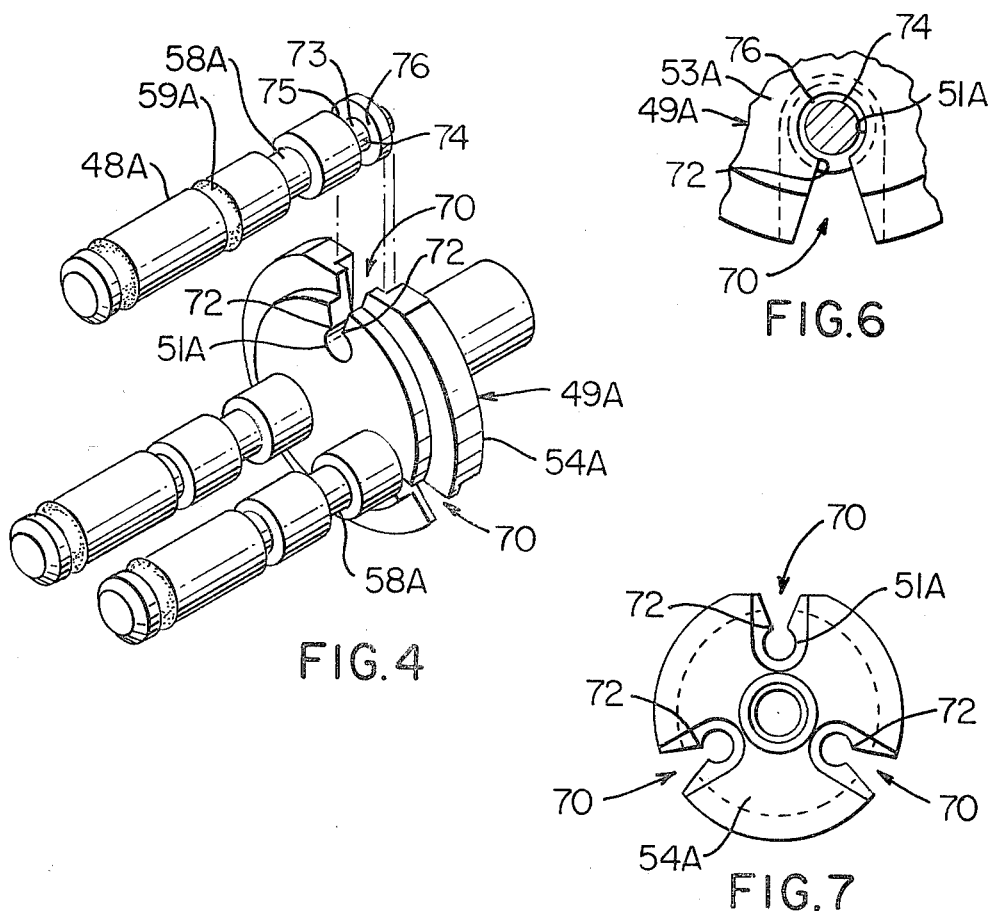

METHOD OF MAKING A VALVE CONSTRUCTION HAVING MULTIPLE PISTONS

BACKGROUND OF THE INVENTION

1. Field of the Invention

This invention relates to an improved valve construction having multiple pistons and to a method of making such a valve construction.

2. Prior Art Statement

It is known to provide a valve construction having a housing means provided with a chamber and port means leading to the chamber and having an axially movable piston means disposed in the chamber to interconnect certain of the port means together in relation to the axial position of the piston means that is caused by a condition responsive device and a spring means operatively associated with the piston means, the piston means comprising a plate and a plurality of pistons disposed in spaced substantially parallel relation and being carried by the plate to be axially moved in unison in the chamber under the influence of the condition responsive device.

For example, see the following U.S. patent:

(1) U.S. Pat. No. 4,228,817—Weaver

The pistons of the valve construction of item (1) above are integral with the plate means that carries the same and therefore are not movable relative thereto.

It is also known to provide an annular groove in each piston of the above prior known valve construction to render each piston more flexible in order to tend to self-align the pistons in the valve construction.

For example, see the following item:

(2) Copending patent application Ser. No. 328,934, filed Dec. 9, 1981—Weaver, now U.S. Pat. No. 4,380,251.

SUMMARY OF THE INVENTION

It is one feature of this invention to provide an improved valve construction having multiple pistons wherein the pistons are adapted to readily self-align themselves relative to each other in the housing means receiving the same.

In particular, it was found according to the teachings of this invention that the pistons could each be carried by the plate of the valve construction in such a manner that the pistons could move relative to each other while maintaining a substantially parallel relation therebetween so as to permit the pistons to self-align in the cavities of the housing means receiving the same.

For example, one embodiment of this invention provides a method of making a valve construction having a housing means provided with a chamber and port means leading to the chamber and having an axially movable piston means disposed in the chamber to interconnect certain of the port means together in relation to the axial position of the piston means that is caused by a condition responsive device and a spring means operatively associated with the piston means, the method comprising the steps of forming the housing means to have a plurality of valve seat sections disposed in spaced substantially parallel relation, forming the piston means to comprise a plate and a plurality of pistons disposed in spaced substantially parallel relation and being carried by the plate as an assembly therewith to be axially moved in unison in the chamber under the influence of the condition responsive device, disposing the piston means as the assembly thereof in the housing means so that the pistons are respectively received in the valve seat sections, and forming the plate and the pistons respectively with means that cooperate together so that the pistons can move relative to each other while maintaining said substantially parallel relation thereof during the step of disposing the piston means in the housing means so that the pistons will self-align with their respective valve seat sections as the pistons are being received therein.

Accordingly, it is an object of this invention to provide a method of making an improved valve construction, such method having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an exploded perspective view of the piston means of the valve construction of FIG. 2.

FIG. 4 is a view similar to FIG. 3 and illustrates the improved piston means of this invention.

FIG. 5 is a fragmentary cross-sectional view similar to FIG. 2 and illustrates the improved piston means of this invention.

FIG. 6 is a fragmentary cross-sectional view taken on line 6—6 of FIG. 5.

FIG. 7 is an end view of the plate of the piston means of FIG. 4.

DESCRIPTION OF THE PREFERRED EMBODIMENT

Figure 1:
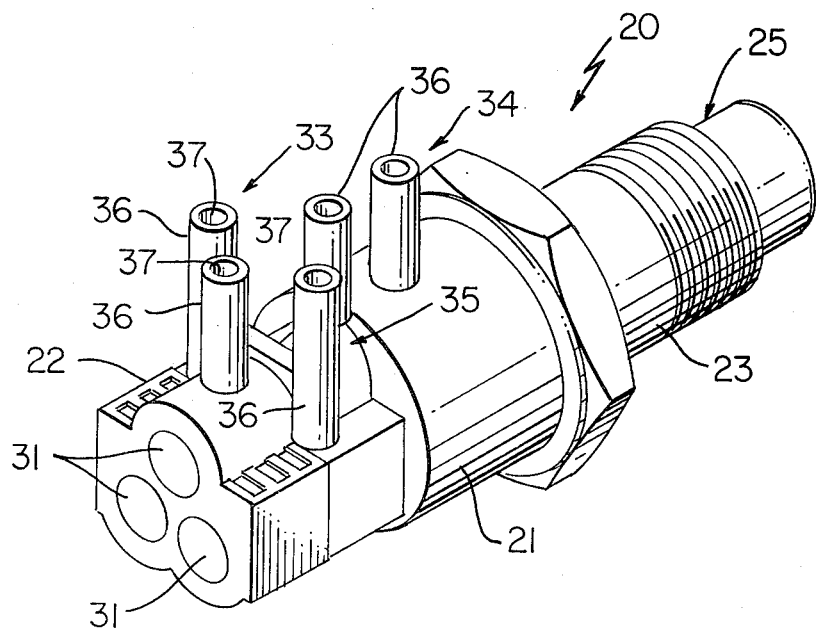
FIG. 1 is a perspective view illustrating the improved valve construction of this invention.

While the various features of this invention are hereinafter described and illustrated as being particularly adapted to provide temperature operated valve constructions, it is to be understood that the various features of this invention can be utilized singly or in any combination thereof to provide a valve construction that can be responsive to other conditions as desired.

Therefore, this invention is not to be limited to only the embodiment illustrated in the drawings, because the drawings are merely utilized to illustrate one of the wide variety of uses of this invention.

Figure 2:
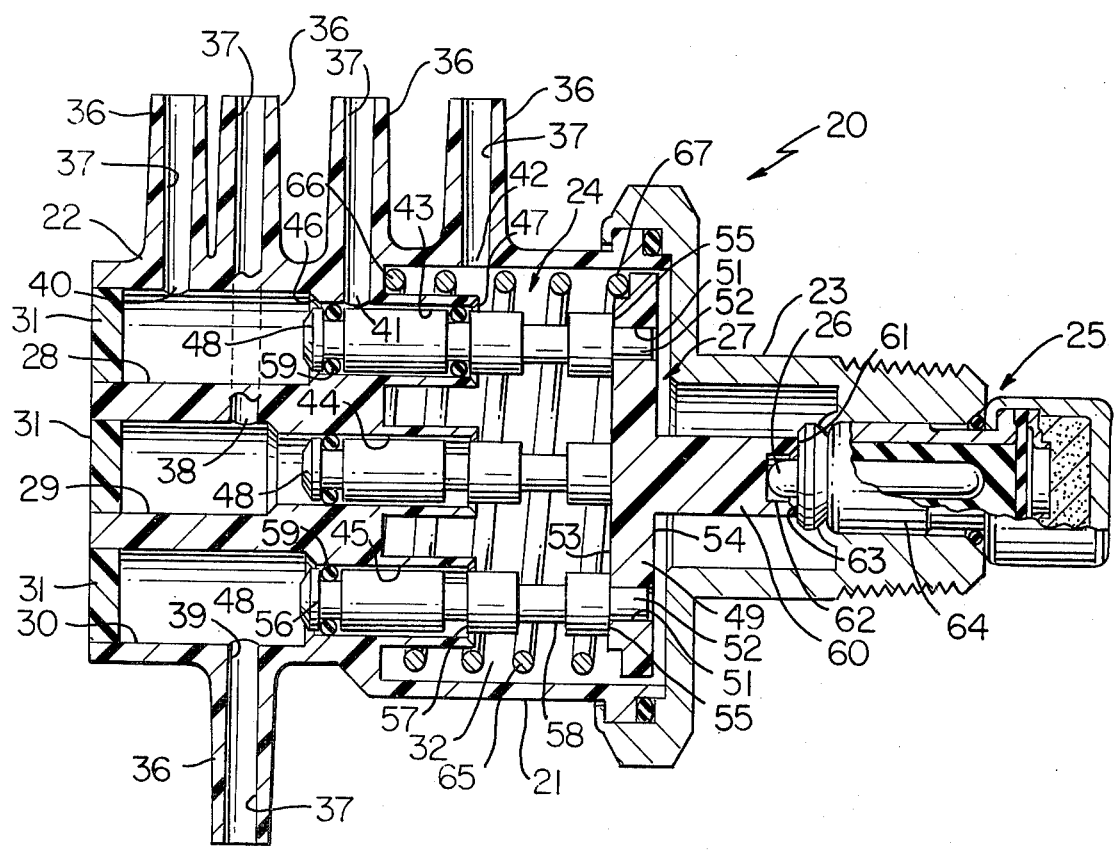
FIG. 2 is an enlarged schematic cross-sectional view of the valve construction of FIG. 1.

Referring now to FIGS. 1 and 2, an improved valve construction of this invention is generally indicated by the reference numeral 20 and comprises a housing means 21 formed from two parts 22 and 23 suitably secured together to define a chamber 24 within the housing member 22 and carrying a conventional piston and cylinder temperature responsive device 25 by the housing member 23 whereby a piston member 26 of the temperature responsive device 25 is adapted to project into the chamber 24 and control the position of a piston means 27 disposed for axial movement therein in a manner hereinafter set forth.

The chamber 24 of the housing means 21 has three cylindrical sections 28, 29 and 30 disposed in spaced parallel relation to each other and respectively having their left-hand ends in FIG. 2 closed by suitable plugs 31 while the right-hand ends thereof in FIG. 2 are adapted to be respectively disposed in fluid communication with a main part or section 32 of the chamber 24 as illustrated.

The housing member 22 has three rows or sets 33, 34 and 35 of outwardly directed nipple means 36 each of which has a port means 37 passing therethrough and intersecting with the chamber 24.

In particular, the row or set 33 of port means 36 comprises a single port 38 that intersects with the section 29 of the chamber 24 while the other row or set 35 of port means 37 comprises a single port 39 that intersects with the section 30 of the chamber 24 as illustrated in FIG. 2.

The intermediate row or set 34 of port means 37 comprises three ports 40, 41 and 42 with the ports 40 and 41 respectively intersecting with the section 28 of the chamber 24 while the port 42 intersects with the main section 32 of the chamber 24 as illustrated in FIG. 2.

The housing member 22 has an inwardly stepped cylindrical valve seat sections 43, 44 and 45 respectively in the chamber sections 28, 29 and 30 thereof for a purpose hereinafter described, the valve seat section 43 having the port 41 interrupting the same intermediate its opposed ends 46 and 47 as illustrated in FIG. 2.

The piston means 27 comprises three pistons 48 being carried by a disc or plate 49 in such a manner that the pistons 48 are adapted to be respectively received in the chamber sections 28, 29 and 30 as illustrated in FIG. 2 as the piston members 48 are carried in a circular array by the plate 49 as illustrated in FIG. 3 with the longitudinal axis of the pistons 48 being substantially parallel to each other and being substantially concentrically disposed about and parallel to the central axis of the plate 49 that is schematically illustrated by the reference numeral 50 in FIG. 3.

The plate 49 of the piston means 27 has a plurality of openings 51 passing therethrough as illustrated in FIGS. 2 and 3 and each piston member 48 has a reduced right end 52 adapted to be respectively received in a respective opening 51 of the plate 49 and be secured therein in any suitable manner, such as by being ultrasonically welded therein as the pistons 48 and plate 49 can comprise plastic material that can be suitably ultrasonically welded as desired.

The plate 49 has opposed surfaces 53 and 54 and each piston 48 has a shoulder 55 that abuts against the surface 53 of the plate 49 when that piston 48 is secured to the plate 49 as illustrated.

Each piston 48 has a plurality of axially spaced apart annular grooves 56, 57 and 58 formed therein with the annular groove 56 of each piston member 48 receiving an annular resilient O-ring 59 therein for respectively sealing in the valve seat sections 43, 44 or 45 of the housing means 22 as illustrated in FIG. 2, the piston member 48 for the valve seat section 43 also having an O-ring 59 disposed in the annular groove 57 thereof as illustrated in FIGS. 2 and 3 so that when the piston member 48 for the valve seat section 43 is disposed in the position illustrated in FIG. 2, the port 41 is sealed by the spaced apart O-rings 59 in the valve seat section 43 respectively from the port 40 and the port 42. However, when the piston 48 for the valve seat section 43 is moved to the left in FIG. 2 so that the left-hand O-ring 59 thereof is moved beyond the end 46 of the valve seat section 43, the port 40 is interconnected to the port 41 for the reasons fully set forth in the aforementioned U.S. Pat. No. 4,228,817 whereby this patent is being incorporated into this disclosure by this reference thereto.

Therefore, it is believed that it is unnecessary to fully describe the operation of the piston members 48 for opening and closing of the various ports 37 for the respective chamber sections 28, 29 and 30 except in the general manner hereinafter set forth in order to fully understand the features of this invention.

The plate 49 has a central extension 60 projecting from the side or surface 54 thereof and being interrupted at the end 61 thereof by an opening 62 that is adapted to receive the piston 26 of the temperature responsive device 25 therein while an end surface 63 of a cylinder part 64 of the device 25 is adapted to abut against the end surface 61 of the plate 49 of the piston means 27 when the piston means 27 has caused substantially a full retraction of the piston member 26 within the housing held cylinder 64 of the device 25 under the force of a compression spring 65 that is disposed in the main part 32 of the chamber 24 and has one end 66 bearing against the housing member 22 and the other end 67 bearing against the plate means 49 to tend to move the piston means 27 to the right in FIG. 2.

The temperature responsive device 25 is conventional in the art and the same contains a wax charge or the like which expands upon the sensing of a certain temperature to force the piston 26 thereof outwardly relative to the housing held cylinder member 64 thereof and when cooled below that certain temperature, the wax charge contracts to permit the piston 26 to be retracted into the cylinder member 64, such as by under the force of the compression spring 65, whereby the temperature sensed by the device 25 determines the position of the piston means 27 relative to the housing means 21 and, thus, determines the interconnection of the port means 37 by the pistons 48 in a manner fully described in the aforementioned U.S. Pat. No. 4,228,817 and as now set forth.

In particular, when the temperature responsive device 25 moves the piston means 27 to the left in FIG. 2, it can be seen that the pistons 48 for the chamber sections 28 and 30 first move the left-hand sealing O-ring members 59 thereof beyond the respective ends 46 and 68 of the respective cylindrical valve seat sections 43 and 44 so as to substantially simultaneously interconnect the port 40 to the port 41 and the port 39 to the main chamber section 32 and, thus, to the port 42 while the port 38 for the chamber section 29 remains sealed from the chamber section 32 as the end 69 of the valve seat section 44 is disposed further to the left than the ends 46 and 68 of the valve seat sections 43 and 45.

However, when the temperature responsive device 25 has moved the piston means 27 sufficiently to the left in FIG. 2 so that the O-ring member 59 of the piston 48 for the valve seat section 44 has moved to the left beyond the end 69 of the valve seat section 44, the port 38 will be interconnected to the main chamber section 32 and, thus, to the port 42.

Conversely, when the device 25 begins to cool and has the piston member 26 thereof retracted by the force of the compression spring 65 moving the piston means 27 to the right in FIG. 2, the O-ring member 59 of the piston 48 for the valve seat section 44 will reenter the valve seat section 44 and thus seal the port 38 from the main chamber section 32 before the O-rings 59 for the piston members 48 of the valve seat sections 43 and 45 reach the ends 46 and 68 of the respective valve seat sections 43 and 45. However, when the piston means 27 has been moved sufficiently to the right by the force of the compression spring 65, so that the O-ring members 59 of the pistons 48 for the valve seat sections 43 and 44 enter into the valve seat sections 43 and 44 as illustrated in FIG. 2, the ports 40 and 41 are disconnected from each other and the port 39 is disconnected from the chamber section 32 and, thus, from the port 42 as illustrated in FIG. 2.

Therefore, it can be seen that the valve construction 20 can be utilized to interconnect certain port means 37 thereof at certain temperature conditions and disconnect certain other port means 37 thereof at other temperatures sensed by the device 25 for the reasons set forth in the aforementioned U.S. Pat. No. 4,228,817.

In order to make sure that the pistons 48 sufficiently align with their respective cylindrical valve seat sections 43, 44 and 45, the annular recesses 58 in the piston members 48 are made relatively long in order to add flexibility to the piston members 48 so that the same will tend to self-align into the valve seat sections 43, 44 and 45 when the piston means 27 is initially assembled in the housing member 22 as illustrated in FIG. 2 and as described in the aforementioned copending patent application, Ser. No. 328,934, filed Dec. 9, 1981 whereby such copending patent application is being incorporated into this disclosure by this reference thereto.

However, even though it has been found that the annular grooves 58 provide such flexibility, there is still a tendency of the pistons 58 to have their axes substantially cock or angle relative to each other should one of the piston members 48 be required to flex in order to be properly received in its respective valve seat sections 43, 44 or 45 whereby there is a resulting adverse sidewise rubbing action on the O-ring sealing means 59 thereof because of such angled relationship between the axes of the piston members 48.

However, it was found according to the teachings of this invention, that the piston members 48 and plate 49 could be uniquely formed so that the same would respectively have means cooperating together to permit the pistons 48 to move relative to each other while still maintaining the substantially parallel relation between the axes thereof whereby the pistons 48 can self-align with the respective valve seat sections 43, 44 and 45 without requiring an angling or flexing of one piston 48 relative to the other pistons 48.

In particular, reference is now made to FIGS. 4–7 wherein another valve construction of this invention is generally indicated by the reference numeral 20A and parts thereof similar to the valve construction 20 previously described are indicated by like reference numerals followed by the reference letter "A".

As illustrated in FIG. 5, the valve construction 20A is substantially identical to the valve construction 20 previously described except for the plate 49A and the pistons 48A and their interconnection to each other which will now be described.

The plate 49A is interrupted by a plurality of wedge-shaped slots 70 that respectively lead from the outer peripheral surface of the plate 49A to the openings 51A, each wedge-shaped slot 70 defining a narrow neck 72 at the respective opening 51A for a snap-fit function as hereinafter set forth. In this manner, the slots 70 and openings 51A as illustrated in FIGS. 6 and 7 each define a substantially keyhole configuration.

Each piston 48A has an annular recess 73 formed therein to the right of the annular recess 58A previously described with the annular recess 73 defining a reduced cylindrical portion 74 of the piston 48A and a pair of opposed shoulders 75 and 76 at each end of the reduced portion 74 thereof.

The diameter of the reduced portion 74 of each piston member 48A is substantially smaller than the diameter of the opening 51A of the plate 49A (see FIG. 6), but is larger than the neck opening 72 of its respective slot 70 so that the reduced portion 74 of a particular piston member 48A can be forced through the neck 72 of the slot 70 to be snapped into the opening 51A and be confined therein by the neck 72 while being movable radially within the opening 51A as fully illustrated in FIG. 6.

The surface 54A of the plate 49A has a plurality of recesses 77 formed therein respectively adjacent the slots 70 and openings 51A to receive the shoulders 76 of the piston members 48A therein as illustrated in FIG. 5, the recesses 77 being large enough to permit the previously described radial movement of the reduced portions 74 of the piston members 48A in the openings 51A.

The shoulders 75 and 76 of the piston members 48A are respectively larger in diameter than the openings 51A and are respectively disposed closely adjacent the opposed sides 53A and 54A of the plate 49A but readily permit radial movement of the reduced portion 74 within the opening 51A so that the pistons 48A when assembled to the plate means 49A can have the axes thereof move relative to each other while those axes remain substantially parallel to each other to thereby permit the piston members 48A to be respectively self-aligned in the valve seat sections 43A, 44A and 45A of the housing member 22A for the reasons previously set forth. In this manner, the O-ring seal members 59A of the pistons 48A will not be subjected to a sidewise wearing out action as would be the case if the piston members 48A were required to flex at the annular recesses 58A thereof for the reasons previously set forth.

Thus, it can be seen that it is a relatively simple method of this invention to make the valve construction 20A because the pistons 48A can be readily assembled to the plate means 49A by merely snap-fitting the reduced portions 74 thereof into the opening 51A through the necks 72 of the wedge-shaped slots 70 so that the pistons 48A are carried by the plate means 49A to move in unison therewith and are adapted to move relative to each other while maintaining a substantially parallel relation relative to each other as well as a parallel relation in the valve seat sections 43A, 44A and 45A of the housing means 22A to prevent a wearing out of the O-rings 59A thereof.

The operation of the valve construction 20A is substantially identical to the operation of the valve construction 20 previously described and therefore need not be repeated.

Thus, it can be seen that this invention not only provides an improved valve construction, but also this invention provides an improved method of making such a valve construction.

While the form and method of this invention now preferred have been illustrated and described as required by the Patent Statute, it is to be understood that other forms and method steps can be utilized and still fall within the scope of the appended claims.

What is claimed is:

1. In a method of making a valve construction having a housing means provided with a chamber and port means leading to said chamber and having an axially movable piston means disposed in said chamber to interconnect certain of said port means together in relation to the axial position of said piston means that is caused by a condition responsive device and a spring means operatively associated with said piston means, said method comprising the steps of forming said housing means to have a plurality of valve seat sections disposed in spaced substantially parallel relation, forming said piston means to comprise a plate and a plurality of pistons disposed in spaced substantially parallel relation and being carried by said plate as an assembly therewith to be axially moved in unison in said chamber under the influence of said condition responsive device, and disposing said piston means as said assembly thereof in said housing means so that said pistons are respectively received in said valve seat sections, the improvement comprising the step of forming said plate and said pistons respectively with means that cooperate together so that said pistons can move relative to each other while maintaining said substantially parallel relation thereof during said step of disposing said piston means in said housing means so that said pistons will self-align with their respective valve seat sections as said pistons are being received therein.

2. A method of making a valve construction as set forth in claim 1 and including the step of snap-fitting said means of said plate and said pistons together.

3. A method of making a valve construction as set forth in claim 1 and including the step of arranging said pistons to be carried by said plate in such a manner that said pistons are disposed in a substantially circular array that is substantially concentric to a central axis of said plate whereby said pistons are adapted to move radially relative to said axis during said step of disposing said piston means in said housing means.

4. A method of making a valve construction as set forth in claim 1 and including the step of forming said means of said plate to comprise a plurality of openings loosely receiving said means of said pistons therein.

5. A method of making a valve construction as set forth in claim 4 and including the step of forming said means of each said piston to comprise a reduced portion thereof.

6. A method of making a valve construction as set forth in claim 5 and including the step of forming said reduced portion of each said piston to define an annular recess therein and a pair of annular shoulders spaced by said recess.

7. A method of making a valve construction as set forth in claim 6 and including the steps of forming said plate to have opposed sides, forming said openings to interrupt said opposed sides, and causing said pistons to each have its said reduced portion loosely received in its respective opening and its said pair of shoulders respectively disposed adjacent said opposed sides of said plate to tend to prevent removal of said piston from its respective opening in an axial direction relative to said opening.

8. A method of making a valve construction as set forth in claim 7 and including the step of snap-fitting said reduced portion of each said piston into its respective opening of said plate.

9. A method of making a valve construction as set forth in claim 8 and including the step of forming a plurality of slot means in said plate that respectively lead to said openings to provide for said snap-fit arrangement.

10. A method of making a valve construction as set forth in claim 9 and including the step of forming each said slot means and its respective opening in said plate to define a substantially key-hole configuration.

* * * * *